United States Patent
Nagarai et al.

(10) Patent No.: US 9,116,956 B2
(45) Date of Patent: Aug. 25, 2015

(54) METHOD AND APPARATUS FOR EFFICIENT AGGREGATE COMPUTATION OVER DATA STREAMS

(71) Applicant: Alcatel-Lucent USA Inc., Murray Hill, NJ (US)

(72) Inventors: Kanthi Chikguntakal Nagarai, Bangalore (IN); Naidu Kundrapu Venkata Marayya, Bangalore (IN); Rajeev Rastogi, Bangalore (IN); Scott Satkin, Westfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/217,907

(22) Filed: Mar. 18, 2014

(65) Prior Publication Data
US 2014/0201222 A1     Jul. 17, 2014

Related U.S. Application Data

(63) Continuation of application No. 11/770,926, filed on Jun. 29, 2007, now Pat. No. 8,832,073.

(51) Int. Cl.
G06F 17/30     (2006.01)

(52) U.S. Cl.
CPC .... *G06F 17/30463* (2013.01); *G06F 17/30412* (2013.01); *G06F 17/30454* (2013.01); *G06F 17/30548* (2013.01); *G06F 17/30864* (2013.01)

(58) Field of Classification Search
CPC ............. G06F 17/30454; G06F 17/30548; G06F 17/30412; G06F 17/30864
USPC ......................... 707/754, 713, 722
See application file for complete search history.

(56) References Cited

U.S. PATENT DOCUMENTS

| 5,412,804 A | 5/1995 | Krishna |
| 5,548,755 A | 8/1996 | Leung et al. |

(Continued)

FOREIGN PATENT DOCUMENTS

| EP | 689148 A1 | 12/1995 |
| EP | 791882 A1 | 8/1997 |

(Continued)

OTHER PUBLICATIONS

W. Liang et al., "Computing Multidimensional Aggregates in Parallel," Parallel and Distributed Systems, IEEE, Dec. 1998, pp. 92-99.

(Continued)

*Primary Examiner* — Shahid Alam
(74) *Attorney, Agent, or Firm* — Ryan, Mason & Lewis, LLP

(57) ABSTRACT

A method includes determining, using a processor, a set of aggregate queries to be executed on a data stream, the set of aggregate queries comprising queries that perform respective sets of aggregation operations on respective sets of attribute values over respective time intervals. The method also includes generating, using the processor, at least one intermediate aggregate query for a subset of the set of aggregate queries, the at least one intermediate aggregate query combining a subset of aggregation operations for the subset of aggregate queries and a subset of attribute values. The method further includes executing, using the processor, the at least one intermediate aggregate query to generate pre-aggregated data from the data stream for the subset of aggregate queries and executing, using the processor, the subset of aggregate queries subsequent to executing the at least one intermediate aggregate query on the pre-aggregated data.

20 Claims, 5 Drawing Sheets

(56) References Cited

U.S. PATENT DOCUMENTS

| | | | |
|---|---|---|---|
| 5,659,725 | A | 8/1997 | Levy et al. |
| 5,742,806 | A | 4/1998 | Reiner et al. |
| 5,812,996 | A | 9/1998 | Rubin et al. |
| 5,822,750 | A | 10/1998 | Jou et al. |
| 5,832,475 | A | 11/1998 | Agrawal et al. |
| 6,088,524 | A | 7/2000 | Levy et al. |
| 6,092,062 | A | 7/2000 | Lohman et al. |
| 6,112,198 | A | 8/2000 | Lohman et al. |
| 6,275,818 | B1 | 8/2001 | Subramanian et al. |
| 6,338,055 | B1 | 1/2002 | Hagmann et al. |
| 6,345,267 | B1 | 2/2002 | Lohman et al. |
| 6,529,896 | B1 | 3/2003 | Leung et al. |
| 6,625,593 | B1 | 9/2003 | Leung et al. |
| 6,850,925 | B2 | 2/2005 | Chaudhuri et al. |
| 6,915,290 | B2 | 7/2005 | Bestgen et al. |
| 7,035,843 | B1 | 4/2006 | Bellamkonda et al. |
| 7,080,062 | B1 | 7/2006 | Leung et al. |
| 7,177,855 | B2 | 2/2007 | Witkowski et al. |
| 7,233,939 | B1 | 6/2007 | Ziauddin |
| 7,330,848 | B2 | 2/2008 | Chaudhuri et al. |
| 7,430,549 | B2 | 9/2008 | Zane et al. |
| 2003/0120682 | A1 | 6/2003 | Bestgen et al. |
| 2004/0220923 | A1 | 11/2004 | Nica |
| 2005/0027701 | A1 | 2/2005 | Zane et al. |
| 2007/0087756 | A1* | 4/2007 | Hoffberg ............ 455/450 |

FOREIGN PATENT DOCUMENTS

| | | | |
|---|---|---|---|
| EP | 1298543 A2 | 4/2003 | |
| JP | 11003354 A | 1/1999 | |
| WO | WO9216906 A1 | 10/1992 | |
| WO | PCTUS2008007575 | 4/2009 | |

OTHER PUBLICATIONS

W. Lehner et al., "Fast Refresh Using Mass Query Optimization," Procs. of the 17th International Conference on Data Engineering (ICDE), IEEE, 2001, pp. 391-398.

J.R. Alsabbagh et al., "A Model for Multiple-Query Processing Based Upon Strong Factoring," Procs. of the International Conference on Information Technolgy: Coding and Computing (ITCC), IEEE, 2004, 6 pages.

M. Santos et al., "Design and Implementation of a Distributed Dual Ascent Algorithm for the Steiner Problem in Graphs," http://www.poms.ucl.ac.be/inoc2007/Papers/author.13/paper/paper.13.pdf, 2007, 6 pages, Brazil.

S. Agarwal et al., "On the Computation of Multidimensional Aggregates," Procs. of the 22nd VLDB Conference, 1996, pp. 1-16, India.

A. Arasu et al., "STREAM: The Stanford Stream Data Manager," IEEE Data Engineering Bulletin, 2003, pp. 1-8.

A. Arasu et al., "Resource Sharing in Continuous Sliding-Window Aggregates," Procs. of the 30th VLDB Conference, 2004, pp. 336-347, Canada.

R. Caceres et al., "Characteristics of Wide-Area TCP/IP Conversations," ACM SIGCOMM, 1991, pp. 1-12.

D. Carney et al., "Monitoring Streams-A New Class of Data Management Applications," Procs. of the 28th VLDB Conference, 2002, pp. 336-347, China.

S. Chandrasekaran et al., "TelegraphCQ: Continuous Dataflow Processing for an Uncertain World," Procs. of the CIDR Conference, 2003.

M. Charikar et al., "Approximation Algorithms for Directed Steiner Problems," SODA, 1998, pp. 1-15.

M. Charikar et al., "Towards Estimation Error Guarantees for Distinct Values," PODS, 2000, 12 pages.

J. Chen et al., "NiagaraCQ: A Scalable Continuous Query System for Internet Databases," SIGMOD, 2000, 12 pages.

C. Cranor et al., "Gigascope: A Stream Database for Network Applications," SIGMOD, Jun. 2003, 5 pages, California.

A. Dobra et al., "Sketch-Based Multi-Query Processing Over Data Streams," EDBT, 2004, 18 pages.

V. Harinarayan et al., "Implementing Data Cubes Efficiently," SIGMOD, 1996, 25 pages.

S. Krishnamurthy et al., "On-the-Fly Sharing for Streamed Aggregation," SIGMOD, Jun. 2006, pp. 623-634, Illinois.

S. Madden et al., "Continuously Adaptive Continuous Queries Over Data Streams," ACM SIGMOD, Jun. 2002, 12 pages, Wisconsin.

K.A. Ross et al., "Materialized View Maintenance and Integrity Constraint Checking: Trading Space for Time," ACM SIGMOD Conference, Jun. 1996, pp. 447-458.

P. Roy et al., "Efficient and Extensible Algorithms for Multi Query Optimization," SIGMOD, 2000, pp. 1-22.

T.K. Sellis et al., "Multiple-Query Optimization," ACM Transactions on Database Systems, Mar. 1988, pp. 23-52, vol. 13, No. 1, California.

R. Zhang et al., "Multiple Aggregations Over Data Streams," SIGMOD, Jun. 2005, 12 pages, Maryland.

K. Nagaraj et al., "Efficient Aggregate Computation over Data Streams," Technical Report ITD-06-47360D, Dec. 2006, pp. 1-13.

C. Liu et al., "A Framework for Global Optimization of Aggregate Queries," Conference on Information and Knowledge Management (CIKM), Proceedings of the Sixth International Conference on Information and Knowledge Management, 1997, pp. 262-269.

A. Tsois et al., "The Generalized Pre-Grouping Transformation: Aggregate-Query Optimization in the Presence of Dependencies," Proceedings of the 29th Very Large Data Bases (VLDB) Conference, 2003, 12 pages, Germany.

B. Cao et al., "A Nested Relational Approach to Processing SQL Subqueries," Proceedings of the 2005 ACM SIGMOD International Conference on Management of Data, Jun. 2005, pp. 191-202.

Z. Chen et al., "Efficient Computation of Multiple Group by Queries," International Conference on Management of Data, Proceedings of the 2005 ACM SIGMOD International Conference on Management of Data, Jun. 2005, pp. 263-274.

* cited by examiner

FIG. 4

Algorithm 1 Greedy($A$): Greedy heuristic for finding aggregate tree.

1: $T_{best}$ is initialized to the aggregate tree in which all $A_i \in A$ are children of the root node;
2: while $T_{best}$ cost improves by at least $e$ do
3:    $T_{cur} = T_{best}$;
4:    for all pairs of sibling aggregates $A, B$ in $T_{cur}$ do
5:       Let aggregate $C = A \cup B$;
6:       Let $P$ be the parent of $A, B$ in $T_{cur}$;
7:       Let $T$ be the tree derived from $T_{cur}$ by (1) adding $C$ as $P$'s child, and (2) making $A, B$ children of $C$;
8:       if $cost(T) < cost(T_{best})$ then $T_{best} = T$;
9:    end for
10:   for all aggregates $A \notin A$ in $T_{cur}$ do
11:       Let $P$ be parent of $A$ in $T_{cur}$;
12:       Let $T$ be the tree derived from $T_{cur}$ by deleting $A$, and making $A$'s children the children of $P$;
13:       if $cost(T) < cost(T_{best})$ then $T_{best} = T$;
14:   end for
15: end while
16: Return $T_{best}$;

FIG. 5

Algorithm 2 Randomized($A$): Randomized heuristic for finding aggregate tree.

1: Initialize $S = A \cup \{T\}$;
2: for $c_1$ iterations do
3:    $R = \emptyset$;
4:    for $c_2$ iterations do
5:      Pick a random number $r$ between 1 and $n$;
6:      Pick $r$ aggregates at random from $A$ and let $B$ be their union;
7:      $R = R \cup \{B\}$;
8:    end for
9:    Let $G$ be the partial aggregate graph on $S \cup R$;
10:   $T_{best}$ = Steiner($G$, T, $A$);
11:   Set $S$ to the set of aggregates that appear in $T_{best}$;
12: end for
13: Return $T_{best}$;

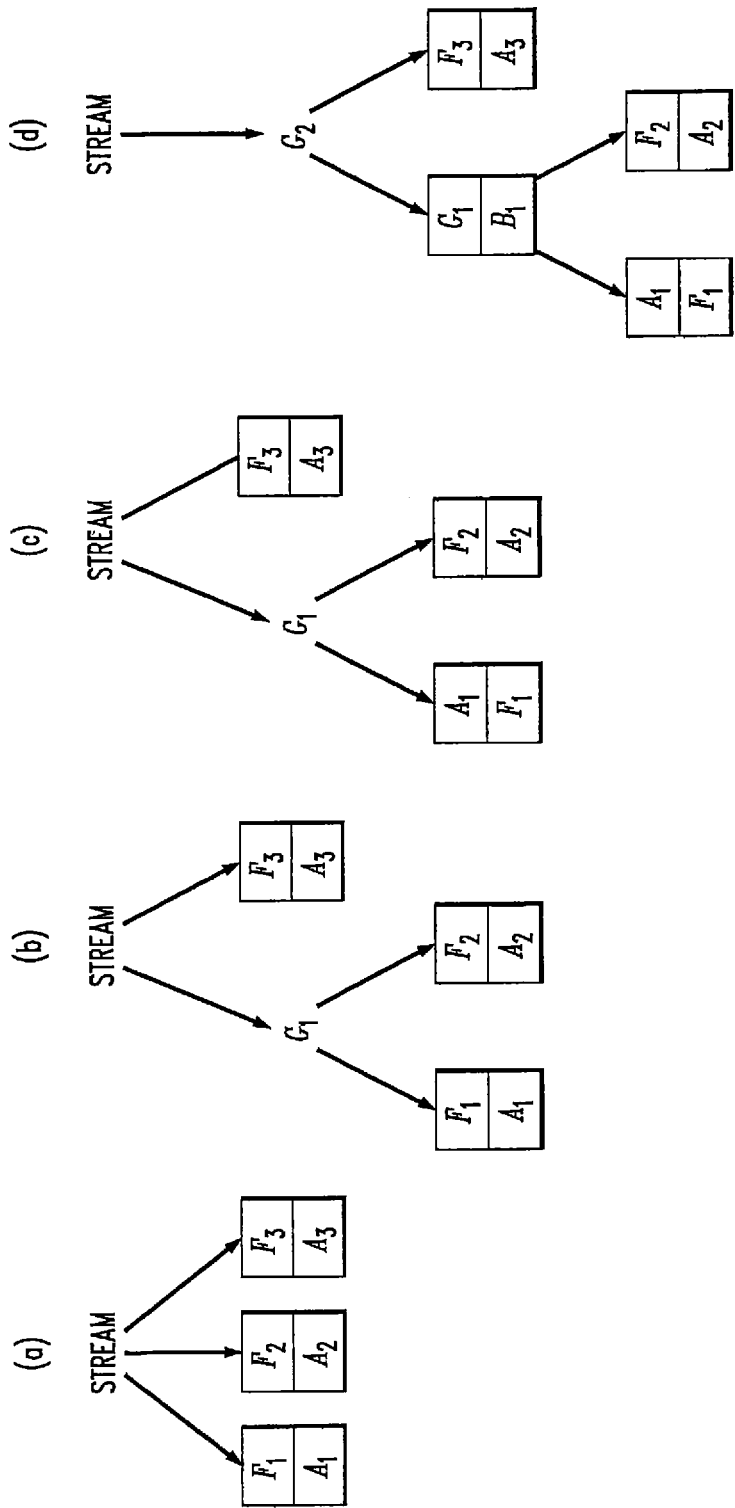

METHOD AND APPARATUS FOR EFFICIENT AGGREGATE COMPUTATION OVER DATA STREAMS

CROSS REFERENCE TO RELATED APPLICATION

This application is a Continuation of U.S. patent application Ser. No. 11/770,926, filed Jun. 29, 2007, the disclosure of which is incorporated by reference herein.

FIELD OF THE INVENTION

The present invention relates generally to data processing systems and, more particularly, to improved techniques for processing data stream queries in such data processing systems.

BACKGROUND OF THE INVENTION

Examples of data streaming applications include applications that process data such as network traffic records, stock quotes, Web clicks, sensor data, and call records. One type of network traffic record is known as a NETFLOW record, which is a record generated in accordance with NETFLOW protocol available from Cisco Systems, Inc. (San Jose, Calif.). NETFLOW and CISCO are trademarks of Cisco Systems, Inc.

Such data streams can generate hundreds of gigabytes of information each day. Processing of such vast amounts of data can obviously place a heavy load on the data processing system that performs such processing. The situation is further exacerbated since analyzing huge volumes of data can require a large number of aggregate queries to be processed. As is known, an aggregate query is a query that performs an aggregate computation (e.g., summation, average, max, min, etc.) on a given data set (e.g., a data stream). These queries may be generated by system administrators seeking to obtain information about the system.

Thus, for real-world deployment, scalability is a key requirement for these types of collection systems. Naïve query answering systems that process the queries separately for each incoming record can not keep up with the high stream rates.

Accordingly, what is required for scalability is an improved technique for processing data stream queries.

SUMMARY OF THE INVENTION

Principles of the invention provide an improved technique for processing data stream queries.

For example, in one aspect of the invention, a method includes determining, using a processor, a set of aggregate queries to be executed on a data stream, the set of aggregate queries comprising queries that perform respective sets of aggregation operations on respective sets of attribute values over respective time intervals. The method also includes generating, using the processor, at least one intermediate aggregate query for a subset of the set of aggregate queries, the at least one intermediate aggregate query combining a subset of aggregation operations for the subset of aggregate queries and a subset of attribute values. The method further includes executing, using the processor, the at least one intermediate aggregate query to generate pre-aggregated data from the data stream for the subset of aggregate queries and executing, using the processor, the subset of aggregate queries on the pre-aggregated data subsequent to executing the at least one intermediate aggregate query.

In another aspect of the invention, an article of manufacture comprises a processor-readable non-transitory storage medium storing one or more instructions. The one or more instructions, when executed by a processor, configure the processor to determine a set of aggregate queries to be executed on a data stream, generate at least one intermediate aggregate query for a subset of the set of aggregate queries, execute the at least one intermediate aggregate query to generate pre-aggregated data from the data stream for the subset of queries, and execute the subset of aggregate queries on the pre-aggregated data subsequent to executing the at least one intermediate aggregate query. The set of aggregate queries comprises queries that perform respective sets of aggregation operations on respective sets of attribute values over respective time intervals. The at least one intermediate aggregate query combines a subset of aggregation operations for the subset of aggregate queries and a subset of attribute values.

In yet another aspect of the invention, an apparatus includes a memory and a processor coupled to the memory. The processor is configured to determine a set of aggregate queries to be executed on a data stream, generate at least one intermediate aggregate query for a subset of the set of aggregate queries, execute the at least one intermediate aggregate query to generate pre-aggregated data from the data stream for the subset of queries, and execute the subset of aggregate queries on the pre-aggregated data subsequent to executing the at least one intermediate aggregate query. The set of aggregate queries comprises queries that perform respective sets of aggregation operations on respective sets of attribute values over respective time intervals. The at least one intermediate aggregate query combines a subset of aggregation operations for the subset of aggregate queries and a subset of attribute values.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 illustrates a greedy heuristic for computing an aggregate tree according to an embodiment of the invention.

FIG. 5 illustrates a randomized heuristic for computing an aggregate tree according to an embodiment of the invention.

FIG. 6(a) through 6(d) illustrate query plans (for queries with filters) generated according to illustrative embodiments of the invention.

DETAILED DESCRIPTION OF PREFERRED EMBODIMENTS

Figure 1:
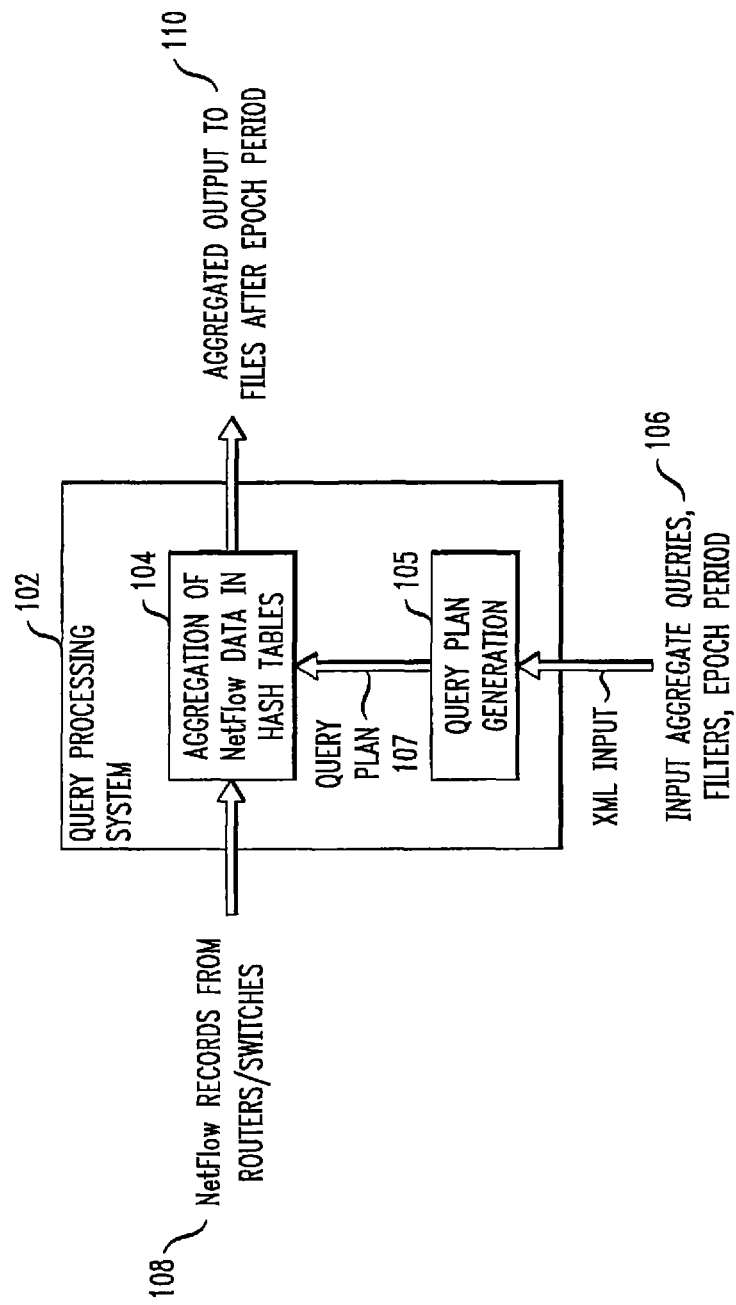
FIG. 1 illustrates a query processing system according to an embodiment of the invention.

Principles of the invention implement the concept of a query execution plan. Given a set of aggregate queries (also referred to herein more simply as "aggregates"), each of which may or may not involve filters, principles of the invention provide techniques for generating a query execution plan. A query execution plan is basically a structure that describes in which order the queries are to be executed.

As will be explained in detail below, the query execution plan may contain certain one or more intermediate aggregates. These intermediate aggregates are fine-grained aggregates, which are then used to generate coarse-grained aggregates. Advantageously, the intermediate aggregates will generally be much smaller than the input data stream itself, and so computing multiple query results from an intermediate aggregate will cost much less than answering these queries directly from the data stream.

With respect to filters, principles of the invention provide techniques for coalescing similar filter conditions into a single filter, which is then used as a pre-filter to reduce the amount of data input to the queries.

Furthermore, it is demonstrated below that query plans incorporating the above two computation sharing optimizations have a tree structure. Principles of the invention also provide a detailed cost model for aggregate query computation that takes into account hash computation and filter evaluation costs. Thus, the problem of finding the optimal query plan with the lowest computation cost is reduced to that of finding the minimum-cost aggregate tree.

It is proven that the problem of finding a minimum-cost aggregate tree is NP-hard. In accordance with principles of the invention, two heuristics are provided, one greedy and one randomized, to find low-cost aggregate trees. In the greedy heuristic, small locally optimal modifications that deliver the maximum cost reduction in each local step are made to the aggregate tree. The randomized heuristic takes a more global approach. In each iteration, the randomized heuristic adds randomized intermediate aggregates to the tree and then uses a directed steiner tree heuristic (R. Wong, "A Dual Ascent Approach for Steiner Tree Problems on a Directed Graph," In *Mathematical Programming*, 1984) to find the minimum cost steiner tree out of the expanded graph.

These and other principles of the invention will be illustrated below in conjunction with NETFLOW records associated with an exemplary NETFLOW collector (NFC) system (available from Cisco Systems, Inc. (San Jose Calif.)) as the exemplary type of data stream and the exemplary data processing system. It should be understood, however, that the invention is not limited to use with any particular type of data stream or data processing system. The disclosed techniques are suitable for use with a wide variety of other data processing systems which process various types of data streams, and in numerous alternative applications.

Cisco's NETFLOW Collector (NFC) ("Cisco CNS NETFLOW Collection Engine Installation and Configuration Guide, 3.0") is representative of an emerging class of applications that require multiple OLAP (Online Analytical Processing) style aggregate queries to be processed over a continuous stream of data. NFC collects IP (Internet Protocol) flow records exported by network devices and allows users to run queries for estimating traffic demands between IP endpoints, computing the top hosts in terms of IP traffic, profiling applications, and detecting network attacks and intrusions. For this reason, it is extensively used by network administrators to manage real-world IP networks. However, besides IP networks, such multiple-query streaming applications can be found in other domains as well, for example, financial tickers, retail transactions, Web log records, sensor node readings, and call detail records in telecommunications.

Principles of the invention were at least in part motivated to improve the scalability of NFC-like applications so that they can process hundreds of queries. In the following, we describe NFC in further detail.

In an IP network, a flow is essentially a continuous unidirectional sequence of packets from a source device to a destination device. NETFLOW, first implemented in Cisco's routers, is the most widely used IP flow measurement solution today. A network device (e.g., router, switch) can be configured to export a single NETFLOW data record for every IP flow that passes through it. Each NETFLOW record has a number of attributes that describe the various flow statistics. Individual attributes can be classified into one of two categories:

Group-by attributes: These include source/destination IP addresses for the flow, source/destination ports, ToS byte, protocol, input and output interfaces, etc.

Measure attributes: These include the number of packets or bytes in the flow, begin/end timestamp, flow duration, etc.

NFC collects the NETFLOW records exported by devices in the network, and processes user-specified aggregate queries on the collected NETFLOW data. Each aggregate query consists of: (1) a subset of group-by attributes—records with matching values for attributes in the subset are aggregated together; (2) an aggregate operator (e.g., SUM, COUNT) on a measure attribute—the measure attribute values for aggregated records are combined using the specified aggregate operator; (3) a boolean filter condition on attributes; and (4) a time period over which aggregation is to be performed—after each successive time period, result tuples for the aggregate query (computed over NETFLOW records that arrived during the time period) are output.

Below, we give an example NETFLOW query that is a variant of the Cisco NFC predefined HostMatrix aggregation scheme (Cisco NFC has 22 predefined aggregation schemes):
group-by: {srcaddr, dstaddr}
aggregate-op: SUM(bytes)
filter: (srcaddr $\in$ 135.254.*.* ^ dstaddr $\in$ 135.254.*.*)
period: 15 min The above query returns the total traffic in bytes between every pair of IP addresses in subnet 135.254.*.* aggregated over 15 minute intervals (note that * is a wild-card that matches any integer between 0 and 255).

A production service provider network contains hundreds of routers which can easily generate massive amounts of NETFLOW data. In fact, it is known that even with a high degree of sampling and aggregation, an IP backbone network alone can generate 500 GB (gigabytes) of NETFLOW data per day (about ten billion fifty-byte records). The situation is further exacerbated since analyzing the huge volumes of NETFLOW data (for diverse network management tasks) requires a large number of aggregation queries to be processed. Thus, for real-world deployment, scalability is a key requirement for a NETFLOW data management system like NFC. The system must be able to process, in real time, hundreds of queries over high-speed NETFLOW data streams. Naive query answering strategies that process the queries separately for each incoming NETFLOW record can not keep up with the high NETFLOW stream rates. Thus, we have realized that what is required for scalability are techniques that improve processing efficiency by avoiding redundant work and sharing computation among the various queries.

In an illustrative embodiment, we disclose two computation sharing techniques for scalable online processing of hundreds of aggregate queries on rapid-rate data streams. A key idea underlying our techniques, in this embodiment, is to first identify similarities among the group-by attributes and filter conditions of queries, and then use these commonalities as building blocks to generate the final query answers.

In accordance with principles of the invention, we assume that the streaming environment has sufficient memory to process the input aggregate queries. This realization is made possible, for example, due to the fact that: (i) RAM (random access memory) prices have dropped considerably in the past few years, allowing machines to be equipped with several GBs of RAM; and (ii) in our experiments with a number of real-life data sets and aggregate queries, we found that query results can be easily accommodated in main memory. For instance, in the NETFLOW record traces stored at the Abilene observatory ("Abilene Observatory Data Collections"), the New York Internet2 backbone router exported a total of 1.7 million NETFLOW records in a 20 minute period (from 11:20 to 11:40 on May 8, 2006). For this data, the aggregate results for the 22 default CISCO NFC queries contain approximately 6 million result tuples that take up only 75 MB (megabytes) of memory.

Therefore, based on current technology trends, we have realized that it is practical to process hundreds of stream queries in main memory. Advantageously, as will be illustrated below, this realization leads to query processing approaches that focus on optimizing CPU (central processing unit) cycles as opposed to main memory usage.

For the sake of convenience, the remainder of the detailed description is organized as follows. In Section 1, we describe a system architecture for implementing query processing techniques of the invention. We describe the system model and cost model for processing queries in Section 2. In Section 3, we present our two heuristics for generating tree-structured query plans for aggregate queries without filters. We extend our heuristics to handle filters in Section 4.

1. Illustrative System Architecture

FIG. 1 shows a block diagram of a data processing system in which techniques of the invention may be implemented. As shown, query processing system 102 includes module 104 for performing aggregation of data (in this embodiment, NETFLOW data) in hash tables, and module 105 for query plan generation.

In general, query plan generation module 105 receives input aggregate queries, filters (if any), and the epoch period. These inputs are defined by the user (e.g., system administrator). While input 106 is referred to as XML (Extensible Markup Language) input in the figure, the query plan generation module of the invention is not limited to processing input of this type. From this input (referred to as 106 in the figure), module 105 generates query plan 107.

Then, with query plan 107 generated by module 105, module 104 inputs the NETFLOW records from the various routers and switches (this is more generally considered as streaming data from one or more sources) in the subject network (referred to as 108 in the figure) and generates aggregated output 110. Given generation of the query plan in accordance with the techniques of the invention, aggregated output 110 is generated by module 104.

It is within the data aggregation module and the query plan generation module that techniques of the invention, to be described in detail below in the following sections, are preferably implemented.

Figure 2:
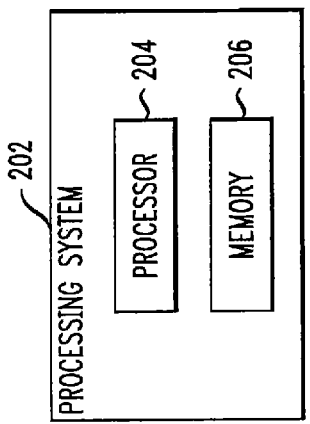
FIG. 2 illustrates a processing system architecture for implementing a query processing system according to an embodiment of the invention.

FIG. 2 shows a processing architecture 202 for implementing query processing system 102 of FIG. 1. One or more software programs for implementing query processing (i.e., query plan generation and aggregate output generation) as described herein may be stored in memory 206 and executed by processor 204. Memory 206 may therefore be considered a processor-readable storage medium. Processor 204 may include one or more integrated circuits, digital signal processors or other types of processing devices, and associated supporting circuitry, in any combination.

The system shown in FIG. 2 may also be considered as the host machine on which the query processing system of FIG. 1 resides, i.e., the computing system upon which a query execution plan is generated and implemented. As mentioned above, principles of the invention are advantageously able to carry out all query processing in the host machine's main memory (memory 206 may be considered as representing the main memory of the host machine). Thus, storage for hash tables is not a major constraint in the system of the invention, and the system can accommodate multiple result tuples in a single hash bucket.

2. Illustrative System and Cost Models

In this section, we first describe the aggregation queries supported by our illustrative query processing system, which may be generalized in a straightforward manner to support a broad range of applications including NETFLOW data management similar to CISCO's NFC. We then present a naive approach that processes each query independently on the input stream, and finally, we develop a cost model for estimating the CPU cycles consumed for producing query answers.

2.1 System Model

We consider a single stream consisting of an infinite sequence of tuples, each with group-by attributes $a_1, \ldots, a_m$ (e.g., source/destination IP addresses, source/destination ports), and a measure attribute $a_0$ (e.g., byte count). We are interested in answering a set of aggregate queries $Q= \{Q_1, \ldots, Q_n\}$ defined over the stream of tuples. A typical aggregate query $Q_i$ has three main components, listed below:

Aggregation. This includes: (1) the subset of group-by attributes on which aggregation is performed—a result tuple is output for each distinct combination of these group-by attribute values; and (2) the aggregation operator that is applied to the measure attribute values of aggregated tuples—this is one of the typical SQL (Structured Query Language) aggregates like MIN, MAX, AVERAGE, SUM, or COUNT.

Filter. This is essentially a boolean expression (containing boolean operators $v$ and $\wedge$) over attribute range conditions. Only tuples whose attribute values satisfy the range conditions specified in the filter expression are considered for aggregation. For instance, the filter (srcaddr $\in$ 135.254.*.* $\wedge$ dstaddr $\in$ 135.254.*.*) in the above example NETFLOW query only aggregates NETFLOW records between IP addresses in subnet 135.254.*.*.

Period. This is the time interval (referred to in FIG. 1 as the epoch period) over which aggregation is performed—after each time period, result tuples for each unique combination of group-by attribute values and the associated aggregated measure attribute value are output.

In this embodiment, we will assume the following: (1) the measure attribute and aggregation operator are the same for all aggregates; and (2) all aggregate queries in Q have the same time period T; thus, result tuples for all aggregates are output at the same time. Our proposed aggregate and filter sharing techniques can, however, be easily extended to handle scenarios when these assumptions do not hold. For example, a straightforward way would be to partition the input query set into subsets of queries, each with identical measure attributes, aggregate operators, and time periods, and then apply our query processing techniques to each subset. Principles of the invention can be extended to other scenarios.

Thus, going back to the assumptions for this embodiment, aggregate queries in Q differ only in their grouping attributes and filters. Consequently, if $A_i$ and $F_i$ denote the group-by attributes and filter expression, respectively, for query $Q_i$, then we can completely characterize each query $Q_i$ by the pair $(A_i, F_i)$. In the remainder of the detailed description, we will use A to denote the collection of grouping attributes $A_i$ for the queries, and F for the set of filters $F_i$. We will also use N to denote the number of stream tuples that arrive in time period T. And finally, in view of the abundance of RAM on modern machines, we will assume that there is adequate main memory for processing queries.

2.2 Naive Query Evaluation Strategy

A naive strategy is to simply process each aggregation query independently for each incoming stream tuple. For each query $Q_i$, we maintain a separate hash table on the group-by attributes $A_i$. The steps involved in processing query $Q_i$ for a tuple are: (1) check if the tuple satisfies the filter condition $F_i$—if not, then simply stop processing the tuple; and (2) hash on the group-by attributes to locate the hash bucket for the tuple, and then update the aggregate statistic for the group-by attribute values. Note that, in the second step, the first time a tuple with a specific combination of grouping attribute values is encountered, a new entry for that group is created (and initialized) in the bucket. If an entry for the group already exists in the bucket, then only the aggregate statistic for the group is updated.

Every time period T, the result tuples for all the aggregates are output by scanning the non-empty buckets in the hash table for each aggregate query, and writing to an output file the group-by attribute values and the aggregate value in every bucket entry. Once all the result tuples are written, all the hash tables are re-initialized by setting their buckets to be empty.

2.3 Query Evaluation Cost Model

Next, let us examine the CPU cost for answering a query $Q_i$ using the above naive strategy. First, we introduce some notation. Let $\sigma_{F_i}$ denote the selectivity of the filter condition $F_i$; thus, a fraction $\sigma_{F_i}$ of stream tuples satisfy $F_i$. Further, let $sz(A_i, F_i)$ be the size of the result after tuples filtered through $F_i$ are aggregated on attributes in $A_i$. Both $\sigma_{F_i}$ and $sz(A_i, F_i)$ can be estimated by maintaining random samples of past stream tuples and applying known sampling-based techniques, for example, as disclosed in Moses Charikar et al., "Towards Estimation Error Guarantees for Distinct Values," In PODS, 2000. Consider a random sample of size r of our stream data set with N tuples. Let $f_1$ and $f_2$ denote the number of values that occur exactly 1 time and 2 or more times, respectively, in the sample. Then the GEE estimator for the number of distinct values is $$\sqrt{\frac{N}{r}} f_1 + f_2.$$

In this embodiment, we use the same random stream sample to estimate the size of all intermediate aggregates considered in our heuristics. Note that in the presence of filters, we require the values that contribute to the counts $f_1$ and $f_2$ to satisfy the filter.

We will use $C_H(A_i)$ to denote the cost of hashing a tuple on its group-by attributes $A_i$. Similarly, $C_F(F_i)$ will denote the cost of checking the filter condition $F_i$ for the tuple. We use the UNIX ELF hash function (e.g., Andrew Binstock, "Hashing rehashed," *Dr. Dobbs, April* 1996) in our hash table implementation; the function first computes a hash value by performing bit manipulation operations on successive bytes of the input value to be hashed. UNIX is a trademark of the Open Group of San Francisco, Calif. It then applies a mod function to compute the hash bucket from the hash value. Our filter evaluation operation considers a conjunction of attribute range conditions, and checks the range condition (by performing two comparisons) for each attribute in the filter. We measured the running times (in nanoseconds or ns) for hashing and filtering on a PC with a 3 GHz INTEL PENTIUM 4 processor running REDHAT ENTERPRISE LINUX 3.0. INTEL PENTIUM is a trademark of Intel Corporation of Santa Clara, Calif. REDHAT ENTERPRISE LINUX is a trademark of Redhat, Inc. of Raleigh, N.C. Both hashing and filtering costs increase linearly with the number of attributes. Hashing incurs about 50 ns for each additional attribute in $A_i$, while filtering requires about 5 ns per attribute range condition in $F_i$. Thus, it follows that hashing is about 10 times more expensive than filtering, for the same number of attributes. In our hash computation experiments, we found the overhead of the final mod function step to be negligible at only about 15 ns. Additionally, when inserting tuples into a hash table, we found that hashing is the dominant cost, and other actions like finding the appropriate bucket entry and updating it consume only a small fraction of the CPU cycles.

Now, the computation cost for query $Q_i$ on each stream tuple includes the cost of applying the filter $F_i$ to the tuple, and then inserting the tuple into the hash table on attributes $A_i$ if it satisfies $F_i$. Thus, since there are N stream tuples in time period T, we get that the CPU cost for processing $Q_i$ over time interval T is $N \cdot C_F(F_i) + N \cdot \sigma_{F_i} \cdot C_H(A_i)$. At the end of time T, the $sz(A_i, F_i)$ result tuples for $Q_i$ are output. In general, $sz(A_i, F_i)$ will be small compared to N, and so we expect output costs to be negligible compared to the computation costs. Also, every query processing scheme will incur identical output costs. So in the remainder of the detailed description, we ignore the cost of writing the result tuples to an output file, and focus primarily on the result computation cost which comprises the CPU cycles for hashing and filtering the incoming stream tuples.

Processing each query in Q independently (as is done by the naive strategy) may lead to redundant computation. In the following sections, we show that by sharing aggregate computation among the queries in Q in accordance with principles of the invention, it is possible to achieve a significant reduction in computation overhead and boost overall system throughput.

3. Processing Aggregate Queries without Filters

We begin by considering queries without filters. Thus, each query $Q_i \in Q$ is simply the group-by attributes $A_i$ on which tuples are aggregated, and query processing costs are completely dominated by the hash function computation costs.

For the multiple-query scenario, the naive approach of maintaining separate hash tables for each aggregation query has the drawback that for each streaming tuple, the hash function value is computed n times, once for each input aggregate $A_i$. In this section, we show how we can reduce the hash function computation overhead by sharing hash tables across aggregates.

3.1 Execution Model and Problem Formulation

To reduce the number of hash operations, our technique instantiates a few intermediate aggregates $B_1, \ldots, B_q$ each of whose size is much smaller than N, and then uses them to compute the various $A_i$s. The reason for the small $B_j$ sizes is that there will typically be many duplicate tuples in the stream when we restrict ourselves to only the grouping attributes in $B_j$—these will all be aggregated into a single result tuple. Now, it is easy to see that each intermediate aggregate $B_j$ can be used to compute any aggregate $A_i \in A$ that it covers (that is, $A_i \subseteq B_j$). This is because all the group-by attribute values for $A_i$ are present in the result tuples for $B_j$. Thus, by making a single pass over the result tuples for $B_j$ and inserting them into the hash table for $A_i$, aggregate $A_i$ can be computed. In this manner, the result tuples for these intermediate aggregates $B_j$ can be used as input (instead of stream tuples) to compute the aggregates in A covered by them. Since the intermediate aggregates $B_j$ are much smaller than the tuple stream, it follows that the number of hash computations is significantly reduced.

In general, our technique instantiates an intermediate aggregate if it is beneficial to the overall query processing plan. For an intermediate aggregate to be beneficial, it preferably has the following property. Assume that: N=input size; S=output size; X=sum of the number of group-by attributes in the queries composing the intermediate aggregate; and Y=number of group-by attributes in the intermediate aggregate. If $S<(N*(X-Y)/X)$, then the intermediate aggregate is beneficial. For example, assume there are 1,000,000 records in the stream, and there are two children composing the intermediate aggregate with group-by attributes: A,B and B,C. N=1,000,000 and X=4. The intermediate aggregate would have group-by attributes: A,B,C. Thus, Y=3. Therefore, for the intermediate to be beneficial, S must be less than $N*(X-Y)/X$, i.e., 1,000,000*(4−3)/4=250,000. Therefore, if the output size is less than 250,000, then S is beneficial. So in this example, S must be ¼th the size of N. However, in practice, it is common to see this ratio exaggerated such that S is many orders or magnitude smaller than N. If the input stream is 1,000,000 records, it is possible for the output size of an intermediate aggregate to be 100 records or less, depending on the data set and the query in question.

More formally, suppose $sz(B_j)$ denotes the size of aggregate $B_j$, that is, $sz(B_j)$ is the number of distinct value combinations observed for group-by attributes $B_j$ in the tuple stream over period T. Then the cost of computing aggregate $A_i$ directly from the stream is $N \cdot C_H(A_i)$. On the other hand, the cost of further aggregating the result tuples for an intermediate $B_j$ to compute an aggregate $A_i$ that it covers is $sz(B_j) \cdot C_H(A_i)$. Thus, by ensuring that $sz(B_j) \ll N$, we can realize substantial cost savings. There is, of course, the additional cost of computing each $B_j$ from the input stream, which is $N \cdot C_H(B_j)$. However, if we select the $B_j$s carefully, then this cost can be amortized across the multiple aggregates $A_i$ that are covered by (and thus computed from) each $B_j$.

Next we address the question of what is the best set of intermediate aggregates $B_j$ to instantiate? Our discussion above points to $B_j$s that are small and cover many input aggregates $A_i$ as good candidates for instantiation. We illustrate the trade-offs between the different alternatives in the following example.

Example 1. Consider a stream with attributes a,b,c and d. Also let the aggregates $A_i \in A$ be defined as follows: $A_1=\{a,b\}$, $A_2=\{a,c\}$, and $A_3=\{c,d\}$. Below, we look at 3 strategies for computing the aggregates $A_i$ (we assume that the hashing cost $C_H(A_i)$ is proportional to the number of attributes in $A_i$).

Figure 3:
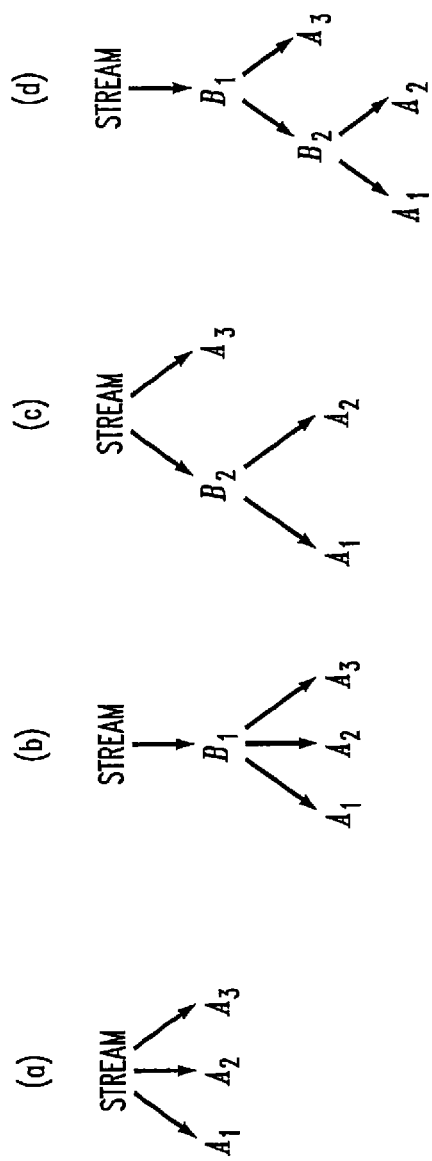
FIGS. 3(a) through 3(d) illustrate query plans (for queries without filters) generated according to illustrative embodiments of the invention.

Strategy 1. This is the naive strategy in which each aggregate $A_i$ is computed directly from the stream (see FIG. 3(a)). Thus, the total cost of computing the aggregates is $\Sigma_i N \cdot C_H(A_i)$.

Strategy 2. This is the other extreme in which we instantiate a single intermediate aggregate that covers all the aggregates $A_i$ (see FIG. 3(b)). Let $B_1=\{a,b,c,d\}$ denote this aggregate. Each time period T, the result tuples in $B_1$ are scanned and inserted into the hash tables for each $A_i$ to compute the final result tuples. The cost of processing the aggregates is thus the sum of the following two costs: (1) $N \cdot C_H(B_1)$, the cost of instantiating $B_1$ from the stream; and (2) $\Sigma_i sz(B_1) \cdot C_H(A_i)$, the cost of generating the aggregates $A_i$ from $B_1$. Thus, the total cost is $N \cdot C_H(B_1)+\Sigma_i sz(B_1) \cdot C_H(A_i)$.

Strategy 3. A possible middle ground between the above two extremes is to maintain a single intermediate aggregate $B_2=\{a,b,c\}$ and the aggregate $A_3=\{c,d\}$ directly on the input stream (see FIG. 3(c)). Then, each time period T, $B_2$ is used to generate the result tuples for $A_1$ and $A_2$ (by inserting $B_2$'s result tuples into the hash tables for $A_1$ and $A_2$). Thus, the cost of processing the aggregates is the sum of the following two costs: (1) $N \cdot C_H(B_2)+N \cdot C_H(A_3)$, the costs of instantiating $B_2$ and $A_3$ from the stream; and (2) $sz(B_2) \cdot C_H(A_1)+sz(B_2) \cdot C_H(A_2)$, the cost of generating the aggregates $A_1$ and $A_2$ from $B_2$. Thus, the total cost is $N \cdot C_H(B_2)+N \cdot C_H(A_3)+sz(B_2) \cdot C_H(A_1)+sz(B_2) \cdot C_H(A_2)$.

Now, suppose that $N \gg sz(B_2)$. Further, suppose that $sz(B_1) \approx N$. This is entirely possible because $B_1$ contains result tuples for every possible combination of attribute values, and the number of such value combinations could be high. In such a scenario, both strategies 1 and 2 have high computation costs because of the large N and $sz(B_1)$ values. In contrast, since $sz(B_2)$ is small relative to N and $sz(B_1)$, it is easy to verify that Strategy 3 results in the lowest cost among the 3 strategies. In fact, if for $B_3=\{a,c,d\}$, it is the case that $sz(B_3) > sz(B_2)$, then Strategy 3 can be shown to be the best possible strategy for answering the aggregate queries.

Note that it is not necessary to compute every intermediate aggregate $B_j$ directly from the stream. Rather, it may be possible to reduce hash computation costs by computing an intermediate $B_j$ from another intermediate aggregate, and then using $B_j$ to compute multiple aggregates $A_i$. For instance, in Example 1, if $N \gg sz(B_1)$ and $sz(B_1) \gg sz(B_2)$, then the following strategy (depicted in FIG. 3(d)) would be better than Strategy 3: compute only $B_1$ from the stream, then compute $B_2$ and $A_3$ from $B_1$, and finally compute $A_1$ and $A_2$ from $B_2$.

Also, observe that each of the query plans considered above (and shown in FIGS. 3(a) through (d)) is essentially a tree with the root node corresponding to the stream, and other nodes corresponding to (intermediate and input) aggregates. Further, a directed edge in the tree indicates that the destination aggregate is computed from the source aggregate. We formalize this using the notion of aggregate trees below.

Aggregate Trees. An aggregate tree is a directed tree with: (1) a special root node corresponding to the input stream; and (2) other nodes corresponding to aggregates. The aggregate for vertex $v_i$ is denoted by $A(v_i)$. At the root node, since the input stream is not aggregated, we use the special symbol T for A(root). T covers every other aggregate $A(v_i)$ but not vice versa, that is, $A(v_i) \subset T$ for all $A(v_i)$—this is because any aggregate can be generated from the input stream. Further, since the root includes all the stream tuples, $sz(T)=N$.

A directed edge $\langle v_1,v_2 \rangle$ from vertex $v_1$ to vertex $v_2$ can be present in the tree only if the aggregate for $v_1$ covers the aggregate for $v_2$ (that is, $A(v_2) \subseteq A(v_1)$). Note that there are no incoming edges into the root node. However, there are no restrictions on outgoing edges from the root, that is, there can be edges from the root to any other node in the tree. Further, all nodes in the aggregate tree are reachable from the root.

Each edge $\langle v_1,v_2 \rangle$ in the tree has an associated cost given by $sz(A(v_1)) \cdot C_H(A(v_2))$. Note that the cost of any edge $\langle v_1,v_2 \rangle$ originating at the root is $N \cdot C_H(A(v_2))$. The cost of a tree is simply the sum of the costs of all its edges.

Intuitively, an aggregate tree corresponds to a query plan capable of generating answers for every aggregate contained in the tree. The directed edge $\langle v_1,v_2 \rangle$ implies that node $v_2$'s aggregate is generated from that of node $v_1$'s. This is possible because $A(v_2) \subseteq A(v_1)$ for a non-root $v_1$, and any aggregate can be generated from the input stream associated with the root node. The plan for a tree generates aggregates in two phases:

Real-time streaming phase. Only the child aggregates of the root node are maintained as tuples are streaming in. Each streaming tuple is inserted into the hash tables of each of the root's children.

Periodic results output phase. At time intervals of period T, the root's children are used to generate the remaining aggregates in the tree. Starting with each child, aggregates are generated by performing a depth first traversal of the tree. Every time a directed edge $\langle v_1, v_2 \rangle$ is traversed, the aggregate for $v_2$ $A(v_2)$ is produced from the result tuples for $A(v_1)$.

Observe that the cost of the edge $\langle v_1, v_2 \rangle$ is the hash computation cost of producing the aggregate $A(v_2)$ from aggregate $A(v_1)$—this is the cost of scanning the $sz(A(v_1))$ result tuples for aggregate $A(v_1)$ (or N stream tuples if $v_1$ is root) and inserting them into the hash table for aggregate $A(v_2)$. Thus, the cost of an aggregate tree reflects the total computation cost of producing all the aggregates in the tree.

Thus, our problem of finding a good query plan (with low hash computation costs) to process the aggregate queries in A reduces to the following:

Given an aggregate set A, compute the minimum-cost aggregate tree T that contains all the aggregates in A.

Our aggregate tree concept allows us to effectively capture, within a single unified framework, the computation costs incurred during the real-time streaming and periodic results output phases. In contrast, existing schemes such as that disclosed by Rui Zhang et al. ("Multiple Aggregations over Data Streams," In *SIGMOD*, 2005) focus exclusively on optimizing the real-time streaming phase cost, which is the dominant cost when the available space is low and collision rates are high. However, this can lead to poor query plans for environments that are not necessarily memory-constrained—this is because in such environments, the periodic results output phase cost becomes significant due to low collision rates, and this is not considered by Rui Zhang et al. Note that as shown above in Example 1, the minimum-cost aggregation tree for A may contain intermediate aggregates not in A.

We have proven that the following decision version of our aggregate tree computation problem is NP-hard: Given an aggregate set A and a constant $\tau$, is there an aggregate tree T with cost at most $\tau$ that also contains all the aggregates in A?

3.2 Heuristics for Computing Aggregate Trees

In this section, we present two heuristics for computing an appropriate aggregate tree. The first is a greedy heuristic that applies a series of local modifications to the tree, at each step, selecting the modification that leads to the biggest cost reduction. The second is a randomized heuristic that adopts a more global approach; it relies on the observation that the aggregate tree computation problem has strong similarities to computing a directed steiner tree over the global aggregate space. So, directed steiner approximation algorithms such as the one proposed in M. Charikar et al., "Approximation Algorithms for Directed Steiner Problems," In *SODA*, 1998 or heuristics like the one in R. Wong, "A Dual Ascent Approach for Steiner Tree Problems on a Directed Graph," In *Mathematical Programming*, 1984 can be used to compute an appropriate aggregate tree.

3.2.1 Greedy Heuristic

Algorithm 1 shown in FIG. 4 contains the pseudocode for our greedy heuristic. The greedy heuristic considers the following two types of local tree modifications in each iteration: (1) addition of a new aggregate C obtained as a result of merging sibling aggregates A,B (steps 4-9); and (2) deletion of an aggregate A (steps 10-14). In each iteration, the local modification that results in the biggest cost decrease is applied to the tree. The heuristic terminates when the cost improvement due to the best local modification falls below a (small) constant threshold $\epsilon$.

Now, lets look at the rationale behind our two local modifications. For a pair of aggregates A,B whose union C is much smaller than their current parent P, our first modification enables cost savings of $sz(P)-2 \cdot sz(C) \approx sz(P)$ to be realized by adding the new aggregate C to the tree. This is because generating C from P requires $sz(P)$ hash computations, and then generating A,B from C incurs an additional $2 \cdot sz(C)$ hash operations, while generating A,B directly from P requires $2 \cdot sz(P)$ operations. The second modification considers the opposite situation when the size of an aggregate A is close to the size of its parent P in the tree—in this case, the extra cost of generating A from P does not offset the cost reduction when A's children are generated from A instead of P. Thus, it is more beneficial in this case to delete A from the tree and compute A's children directly from P.

Note that, in the worst-case, we may need to consider a quadratic (in n, the number of input aggregates) number of local modifications in a single iteration. Since the cost benefit of each local modification can be computed in constant time, each iteration has a worst case time complexity that is quadratic in the size of the input.

3.2.2 Randomized Heuristic

As is evident, the greedy heuristic considers local modifications like merging a pair of siblings. In contrast, the randomized heuristic that we propose in this section takes a more global perspective—in each merge step, it coalesces multiple randomly chosen aggregates from A to generate new intermediate aggregates.

Before discussing our randomized heuristic, we make an important observation that relates our aggregate tree computation problem to the problem of computing a directed steiner tree. Consider the graph containing a node for every possible aggregate (that is, every possible subset of group-by attributes), and also T for the input stream. In the aggregate graph, there is a directed edge from aggregate A to aggregate B if A covers B, and the cost of the edge is $sz(A) \cdot C_H(B)$. Now, it is easy to see that computing the optimal aggregate tree T is nothing but computing a directed steiner tree (in the graph) that connects the root T to the set of aggregates A.

Although computing a directed steiner tree is an NP-hard problem, there exist approximation algorithms (e.g., M. Charikar et al., "Approximation Algorithms for Directed Steiner Problems," In *SODA*, 1998) and heuristics (e.g., R. Wong, "A Dual Ascent Approach for Steiner Tree Problems on a Directed Graph," In *Mathematical Programming*, 1984) in the literature for computing such a tree. Thus, we could theoretically use a directed steiner approximation algorithm to find a good aggregate tree in the full aggregate graph. However, the problem with this is that the full graph contains $2^m$ nodes (a node for every subset of group-by attributes). This is exponential in the number of attributes, and so any approach that is based on creating the full graph will only work for a small number of attributes.

As illustrated in FIG. 5. our randomized heuristic (Algorithm 2) circumvents this exponential problem by employing randomization in successive iterations to construct a sequence of partial (instead of full) aggregate graphs. At the end of each iteration, variables $T_{best}$ and S keep track of the current best aggregate tree and the aggregates contained in it, respectively. In each iteration, we pick a set R of $c_2$ random intermediate aggregates (steps 4-8), and construct a partial aggregate graph G on S∪R. G contains edges from an aggregate to every other aggregate that it covers. We then invoke the dual-ascent directed steiner heuristic of R. Wong ("A Dual Ascent Approach for Steiner Tree Problems on a Directed Graph," In *Mathematical Programming*, 1984) to compute a minimum-cost tree connecting root T to aggregates in A in graph G. The user-defined parameters $c_1$ and $c_2$ determine the number of iterations and the number of random aggregates selected in each iteration, respectively—in our experiments, we were able to obtain satisfactory trees with settings $c_1=50$ and $c_2=n$, the number of input aggregates.

Advantageously, since the running time of each iteration of Algorithm 2 is dominated by steiner tree computation, our randomized heuristic scales well with the number of queries.

4. Processing Aggregate Queries with Filters

We now turn our attention to aggregate queries with filters. So, each query $Q_i$ now consists of a set $A_i$ of grouping attributes and a filter $F_i$. In the following subsections, we will show how the aggregate tree concept and our heuristics for computing good trees can be extended to handle these richer query types.

4.1 Execution Model and Problem Formulation

In the presence of filters, principles of the invention can reduce computational overhead by sharing filter evaluation among the various queries. For instance, we can coalesce a group of similar query filters, and then with a single application of the coalesced filter, discard a significant fraction of stream tuples that are not relevant to the queries. Further, depending on the selectivity of filters, the location and order in which filters and hashing operations are executed in the aggregate tree can make a substantial difference to the overall computation costs. We illustrate these ideas in the following example.

Example 2. Consider a stream with attributes a, b, c, and d each with domain $\{0, \ldots, 1000\}$. For purposes of illustration, we assume that attribute values are uniformly distributed and independent. Let there be three queries: (1) $Q_1$ with group-by attributes $\{a,b\}$ and filter $0 \leq a \leq 95$; (2) $Q_2$ with group-by attributes $\{a,c\}$ and filter $50 \leq a \leq 100$; and (3) $Q_3$ with group-by attributes $\{a,d\}$ and filter $200 \leq a \leq 300$. Now there are multiple query evaluation strategies possible here, which we consider below.

Strategy 1. The naive strategy is to process each query separately (see FIG. 6(a))—thus for each stream tuple, query pair, we first check to see if the tuple satisfies the query filter, and if so, we insert the tuple into the hash table for the query.

Strategy 2. Now a more efficient strategy can be devised based on the observation that the filters $F_1$ and $F_2$ have a fair amount of overlap and so can be merged to create a new filter, $G_1 = 0 \leq a \leq 100$. Note that $G_1$ is equivalent to $F_1 \vee F_2$. The idea then would be to evaluate the filter $G_1$ for every stream tuple, and only if the tuple satisfies $G_1$ would we check the filters $F_1$ and $F_2$ for the queries $Q_1$ and $Q_2$, respectively. Of course, if the tuple does not satisfy $G_1$, then it cannot possibly satisfy $F_1$ or $F_2$, and thus, the tuple can be safely discarded. Thus, with Strategy 2 (depicted in FIG. 6(b)), we perform only one filter check for tuples that do not satisfy $G_1$, and three filter evaluations for tuples that satisfy $G_1$. It follows that over N tuples, the filter sharing strategy results in $(1+2\sigma_{G_1}) \cdot N$ filter operations, where $\sigma_{G_1}$ denotes the selectivity of filter $G_1$. In contrast, the naive strategy requires 2N filter checks for processing queries $Q_1$ and $Q_2$. Now, since attribute values are uniformly distributed, $\sigma_{G_1}=0.1$. Thus, since $2\sigma_{G_1}=0.2<1$, the filter sharing strategy has lower filter evaluation costs compared to the naive strategy.

Strategy 3. Next observe that filter $F_1$ has significant overlap with filter $G_1$. Consequently, when $F_1$ is applied immediately after $G_1$ on stream tuples (as in FIG. 6(b)), the number of additional tuples filtered out by $F_1$ is $(\sigma_{G_1}-\sigma_{F_1}) \cdot N$. This translates to filtering out 0.005 fraction of the N stream tuples that do not need to be inserted into the hash table for $Q_1$, thus leading to computational savings of $0.005 \cdot N \cdot C_H(A_1)$. However, there is the additional cost of applying the filter $F_1$ on tuples filtered through $G_1$ which is given by $\sigma_{G_1} \cdot N \cdot C_F(F_1)$.

Now suppose that the aggregated result size $sz(A_1, G_1) << \sigma_{G_1} \cdot N$. Then, Strategy 3 (depicted in FIG. 6(c)) avoids the filtering cost of $\sigma_{G_1} \cdot N \cdot C_F(F_1)$ by applying filter $F_1$ while the result tuples for $Q_1$ are being output from the hash table instead of applying it before stream tuples are inserted into the hash table. Note that since $sz(A_1,G_1) << \sigma_{G_1} \cdot N$, the cost of applying filter $F_1$ on the aggregated result is negligible. However, postponing application of the filter $F_1$ will result in $(\sigma_{G_1}-\sigma_{F_1}) \cdot N$ additional tuples (see above) being inserted into the hash table, leading to an additional cost of $0.005 \cdot N \cdot C_H(A_1)$. Thus, depending on which of the two quantities $0.005 \cdot N \cdot C_H(A_1)$ or $0.1 \cdot N \cdot C_F(F_1)$ is greater, we should apply $F_1$ either before inserting tuples into the hash table or while they are being output from the hash table. In our case, since $C_H(A_1) \approx 10 C_F(F_1)$, it is more cost-effective to apply $F_1$ at the end when result tuples are being output.

Observe that the same argument does not hold for $F_2$ which filters $(\sigma_{G_1}-\sigma_{F_2}) \cdot N$ tuples thus saving $0.05 \cdot N \cdot C_H(A_2)$ in hashing costs. Since checking $F_2$ on the filtered stream from $G_1$ costs only $0.1 \cdot N \cdot C_F(F_2)$, the cost savings from hashing fewer tuples far outweigh the additional cost of evaluating $F_2$—thus, in Strategy 3, we apply $F_2$ before tuples are inserted into the hash table for $Q_2$.

Strategy 4. Now if $sz(B_1) << N$ for aggregate $B_1=\{a,b,c\}$, then in addition to applying the filter $G_1$ on the tuple stream, Strategy 4 (shown in FIG. 6(d)) further reduces computation costs by aggregating the stream on attributes $B_1$ prior to feeding the tuples into the hash tables for queries $Q_1$ and $Q_2$. Furthermore, even though $G_1$ and $F_3$ do not overlap, it obtains further improvements in filter evaluation costs by introducing a new filter $G_2=0 \leq a \leq 300$ obtained as a result of merging filters $G_1$ and $F_3$. This is because $2\sigma_{G_2}=0.6<1$.

For simplicity of exposition, we will initially only consider filters that are conjunctions (^) of attribute range conditions. Thus, each filter is a multi-dimensional box whose boundaries along a dimension coincide with the range specified for the attribute corresponding to the dimension. Only tuples belonging to the box (with attribute values in the ranges specified in the filter) are considered for aggregation. The union $F=F_1 \cup F_2$ of two filters $F_1$ and $F_2$ is a box that contains the boxes for $F_1$ and $F_2$. Essentially, in the union F, the range for each attribute a contains its ranges in $F_1$ and $F_2$. For example, if $F_1=(0 \leq a \leq 5 \wedge 0 \leq b \leq 5)$ and $F_2=(5 \leq a \leq 10 \wedge 5 \leq b \leq 10)$, then their union $F=(0 \leq a \leq 10 \wedge 0 \leq b \leq 10)$. In Section 4.3, we will discuss how our techniques can be extended to handle filters containing disjunctions (∨) as well.

We will also assume that for each query $Q_i$, the filter attributes in $F_i$ are a subset of the group-by attributes $A_i$. We expect that this will be the case for a majority of the queries. For the few queries $Q_i$ that do not satisfy this assumption, we can either: (1) process $Q_i$ separately; or (2) process a variant $Q'_i$ of $Q_i$ jointly with other queries in Q if we find that this leads to lower query processing costs. Here, $Q'_i=(A'_i,F'_i)$ is derived from $Q_i$, and has the same filter as $Q_i$ (that is, $F'_i=F_i$), but its group-by attributes set $A'_i$ contains attributes in both $A_i$ and $F_i$. Since $A_i \subset A'_i$, the answer for $Q_i$ can be derived from the result for $Q'_i$ by performing a final additional aggregation step. Note that the cost for the additional aggregation step needs to be added to the processing cost for $Q'_i$.

Aggregate Trees. In the presence of filters, each node of the aggregate tree is a (filter, grouping attributes) pair. Note that there is an implicit ordering of filter and aggregation operations in each node depending on the input tuples to the node. We discuss details below. The root node is special with a (filter, attributes) pair equal to (T, T), and corresponds to the input stream. Here, T is a special symbol that contains all other filters and grouping attributes, but not vice versa. Further, all tuples satisfy the filter condition T. Intuitively, nodes with group-by attributes equal to T perform no aggregation, and nodes with filters equal to T do no filter checks. In the aggregate tree, there can be an edge from a vertex $v_1$ to a vertex $v_2$ only if $v_1$ covers $v_2$, that is, the filter and group-by attributes of $v_1$ contain the filter and group-by attributes, respectively, of $v_2$. Note that since T contains every other filter and group-by attributes, the root can have edges to every other node in the tree.

Execution Plan for Aggregate Trees. Now, an aggregate tree essentially specifies an execution plan for answering the input aggregate queries. Let V denote the set of tree nodes where incoming stream tuples are first aggregated. More formally, V contains all tree nodes v such that: (1) the group-by attributes of v is not T (that is, v performs aggregation); and (2) the path from the root to v only has nodes with group-by attributes equal to T (that is, none of v's ancestors perform aggregation).

As before, the execution plan has two phases:

Real-time streaming phase: We maintain a hash table for each intermediate node v in V on the grouping attributes for v. Each incoming stream tuple is inserted into the hash table for v if and only if it satisfies all the filters in the path from the root to v.

Periodic results output phase: After time period T, the result tuples in the hash table for each intermediate node v in V are used to compute the result tuples for nodes in the aggregate subtree rooted at v. Essentially, the result tuples for v are used to compute the result tuples for v's children, and their result tuples, in turn, are used to compute the result tuples for their children, and so on. Let $v_1$ be $v_2$'s parent in the subtree ($v_1$ and $v_2$ differ in their filters or their grouping attributes). Also, let $(G_i, B_i)$ denote the (filter, group-by attributes) pair at node $v_i$. Then, when computing $v_2$'s result tuples from $v_1$'s tuples, we need to consider the following three cases.

Case 1: $v_2$'s filter is identical to $v_1$'s filter. Note that this covers the case that $v_2$'s filter is T. In this case, all the result tuples for $v_1$ are aggregated on $v_2$'s group-by attributes by inserting them into a hash table on $v_2$'s attributes (without any filtering). The aggregated tuples in the hash table are the result tuples for $v_2$, and the cost of computing these tuples is $sz(B_1,G_1) \cdot C_H(B_2)$.

Case 2: $v_2$'s group-by attributes are identical to $v_1$'s attributes. Note that this covers the case that $v_2$'s grouping attributes are T. In this case, only $v_2$'s filter condition is applied to all the result tuples for $v_1$ (without any aggregation), and those that satisfy the filter constitute the result tuples for $v_2$. The cost of computing these tuples is $sz(B_1,G_1) \cdot C_F(G_2)$.

Case 3: $v_1$ and $v_2$ have different filters and group-by attributes. In this case, we have two options: (1) first apply $v_2$'s filter to $v_1$'s result tuples, and then aggregate the ones that satisfy the filter on $v_2$'s group-by attributes; or (2) first aggregate $v_1$'s result tuples on $v_2$'s group-by attributes, and then filter out the aggregate tuples that do not satisfy $v_2$'s filter. Depending on which of the two options has a lower cost, we will order the filtering and aggregation operations in $v_2$ differently. The costs of the two options are as follows:

$$\text{Option}(1)\text{cost}=sz(B_1,G_1) \cdot C_F(G_2)+sz(B_1,G_2) \cdot C_H(B_2)$$

$$\text{Option}(2)\text{cost}=sz(B_1,G_1) \cdot C_H(B_2)+sz(B_2,G_1) \cdot C_F(G_2)$$

Thus, the cost of computing $v_2$'s result tuples is the minimum of the costs of options (1) and (2) above. Intuitively, if $sz(B_1,G_2) \ll sz(B_1,G_1)$, then Option (1) is preferable. If this is not the case and if $sz(B_2,G_1) \ll sz(B_1,G_1)$, then Option (2) may prove to be better.

Problem Definition. We assign a cost to each tree edge $\langle v_1, v_2 \rangle$ equal to the CPU cost of materializing the result tuples for $v_2$ using the tuples of $v_1$ (as described in the 3 cases above). Thus, the aggregate tree cost (which is the sum of the edge costs) reflects the total CPU cost of processing all the input aggregate queries. Our objective then is to find the minimum-cost aggregate tree containing all the input aggregate queries in Q.

4.2 Heuristics for Computing Aggregate Trees

It can be proven that the more general problem of computing the optimal aggregate tree for queries containing filters is NP-hard. In the following subsections, we extend the greedy and randomized heuristics presented above in sections 3.2.1 and 3.2.2, respectively, to compute a satisfactory low-cost aggregate tree.

4.2.1 Greedy Heuristic

In each iteration, our modified greedy heuristic applies four types of local modifications to the tree, and selects the one that results in the largest cost reduction. Of the four modifications listed below, the first two are variants of previously proposed modifications for queries without filters (see Algorithm 1 in FIG. 4).

1. For every pair of sibling nodes $v_1, v_2$ (with parent p), create a new node v with p as parent, and make $v_1, v_2$ children of v. Set node v's filter and group-by attributes equal to the union of the filters and group-by attributes, respectively, of $v_1$ and $v_2$.

2. For every node $v \notin Q$ (with parent p), delete v from the tree, and make p the parent of v's children.

3. For every node $v \notin Q$, modify v's group-by attributes to be equal to its parent's group-by attributes.

4. For every node $v \notin Q$, modify v's filter to be equal to its parent's filter.

FIGS. 6(c) and 6(d) (in Example 2) depict aggregate trees containing nodes that apply filters but do not perform aggregation (the reverse situation is possible as well). Modifications 3 and 4 described above have the effect of suppressing aggregation and filtering, respectively, within node v, and thus allow such nodes to be included in the aggregate tree by our greedy heuristic. Note that a simple optimization to our greedy heuristic would be to consider pairs of local modifications in each iteration instead of only a single modification. This would allow, for example, modifications 1 and 3 above to be combined to obtain a variant of modification 1 in which the merged node v's aggregation component is suppressed.

4.2.2 Randomized Heuristic

Similar to Algorithm 2 (in FIG. 5) presented above in Section 3.2.2, in each iteration, our randomized heuristic randomly selects a set of aggregate nodes R, and then computes a directed steiner tree within the aggregate graph on S∪R. However, in order to ensure that R contains candidate nodes with suppressed aggregation or filtering components, its elements are generated by repeating the following steps a constant ($c_2$) number of times:

1. Randomly select a subset of input query nodes from Q.
2. Let v denote the union of (filters and group-by attributes of) the nodes selected above. Add v to R.
3. For every other node u in S that covers v, we add the following two additional nodes x and y to R:
   Node x with v's filter, but u's group-by attributes.
   Node y with v's group-by attributes, but u's filter.

4.3 Handling Complex Filters

Our proposed techniques can be extended to handle complex filters containing disjunctions (in addition to conjunctions). We will assume that each filter F is in disjunctive normal form, that is, each filter has the form $D_1 \vee \ldots \vee D_l$ where each $D_i$ is a conjunction of attribute range conditions. Thus, our filter F now is a union of multiple boxes instead of a single box. Consequently, we can model the cost $C_F(F)$ of evaluating filter F as $\Sigma_i C_F(D_i)$, and for estimating the size of aggregates with filters, we can use the sampling-based estimator described in the previous subsection.

Now, in our heuristics, we compute the filter F for a new node in the aggregate tree as the union $F_1 \cup \ldots \cup F_q$ of multiple filters. When each $F_i$ is a single box, their union is simply the box that contains all the filter boxes. However, when each $F_i$ is a set of boxes $\{D_1^i, \ldots, D_{l_i}^i\}$, the union computation for $F=F_1 \cup \ldots \cup F_q$ is somewhat more involved. We begin by initializing the union F to be the set of all the boxes $D_j^i$, that is, $F=\{D_j^i : 1 \le i \le q, 1 \le j \le l_i\}$. Now, if F is used to pre-filter tuples into the filters $F_i$, then the filtering cost per tuple is $C_F(F) + \sigma_F \cdot \Sigma_i C_F(F_i)$—here the first term is the cost of checking whether the tuple satisfies F and the second term is the cost of checking filters $F_i$ if the tuple satisfies F. Clearly, the ideal value for the union F is one that minimizes the filtering cost $C_F(F) + \sigma_F \cdot \Sigma_i C_F(F_i)$. So we repeat the following step until no further improvement in filtering cost is possible: Let $D_1, D_2$ be the pair of filter boxes in F whose merging results in an F with the smallest filtering cost; merge $D_1, D_2$ (by taking their union) into a single box.

As described above in detail, principles of the invention provide two techniques for sharing computation among multiple aggregate queries over a data stream: (1) instantiating certain intermediate aggregates; and (2) coalescing similar filters and using the coalesced filter to pre-filter stream tuples. We proposed two heuristics, one greedy and another randomized, for finding low-cost query plans incorporating the above optimizations. In our experiments with real-life NETFLOW data sets, we found that our randomized heuristic generated the best query plans with maximum sharing—this is because it adopts a more global approach, continuously interleaving optimization steps with random perturbations to the query plan. In fact, query plans output by our randomized heuristic boosted system throughput by over a factor of three compared to a naive approach that processes queries separately.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   determining, using a processor, a set of aggregate queries to be executed on a data stream, the set of aggregate queries comprising queries that perform respective sets of aggregation operations on respective sets of attribute values over respective time intervals;
   generating, using the processor, at least one intermediate aggregate query for a subset of the set of aggregate queries, said at least one intermediate aggregate query combining a subset of aggregation operations for the subset of aggregate queries and a subset of attribute values;
   executing, using the processor, said at least one intermediate aggregate query to generate pre-aggregated data from the data stream for the subset of aggregate queries; and
   executing, using the processor, the subset of aggregate queries on the pre-aggregated data subsequent to executing said at least one intermediate aggregate query;
   wherein each of at least two aggregate queries in the subset of aggregate queries comprises:
      a number of group-by attributes on which aggregation is performed; and
      a time interval over which aggregation is performed.

2. The method of claim 1, wherein generating said at least one intermediate aggregate query further comprises determining that said at least one intermediate aggregate query reduces a computational cost of executing the set of aggregate queries to be executed on the data stream.

3. The method of claim 1, wherein said at least one intermediate aggregate query comprises a number of group-by attributes, the number of group-by attributes in said at least one intermediate aggregate query being less than a sum of the numbers of group-by attributes in the subset of aggregate queries.

4. The method of claim 3, wherein generating said at least one intermediate aggregate query further comprises determining that $$S < \frac{N * (X - Y)}{X}$$

where N is a given input size of tuples in the data stream, S is the output size of tuples of said at least one intermediate aggregate query, X is the sum of the numbers of group-by attributes for aggregate queries in the subset of aggregate queries and Y is the number of group-by attributes in said at least one intermediate aggregate query.

5. The method of claim 1, further comprising subjecting at least one of the aggregate queries in the subset of aggregate queries to a respective set of attribute filters specifying respective attribute range conditions for respective sets of attribute values associated with the at least one of the aggregate queries.

6. The method of claim 5, wherein said at least one intermediate aggregate query is generated by combining respective attribute filters of two or more of the subset of aggregate queries to form a single attribute filter usable to pre-filter pre-aggregated data input to the two or more aggregate queries.

7. The method of claim 1, wherein the data stream comprises network traffic records.

8. The method of claim 1, wherein the data stream comprises Internet Protocol flow records.

9. The method of claim 1, wherein the data stream comprises at least one of: sensor node readings; call detail records in a telecommunications network; retail transaction records; and one or more financial tickers.

10. An article of manufacture comprising a processor-readable non-transitory storage medium storing one or more instructions which, when executed by a processor, configure the processor to:

determine a set of aggregate queries to be executed on a data stream, the set of aggregate queries comprising queries that perform respective sets of aggregation operations on respective sets of attribute values over respective time intervals;

generate at least one intermediate aggregate query for a subset of the set of aggregate queries, said at least one intermediate aggregate query combining a subset of aggregation operations for the subset of aggregate queries and a subset of attribute values;

execute said at least one intermediate aggregate query to generate pre-aggregated data from the data stream for the subset of queries; and execute the subset of aggregate queries on the pre-aggregated data subsequent to executing said at least one intermediate aggregate query;

wherein each of at least two aggregate queries in the subset of aggregate queries comprises:
  a number of group-by attributes on which aggregation is performed; and
  a time interval over which aggregation is performed.

11. The article of manufacture of claim 10, wherein generating said at least one intermediate aggregate query further comprises determining that said at least one intermediate aggregate query reduces a computational cost of executing the set of aggregate queries to be executed on the data stream.

12. The article of manufacture of claim 10, wherein said at least one intermediate aggregate query comprises a number of group-by attributes, the number of group-by attributes in said at least one intermediate aggregate query being less than a sum of the numbers of group-by attributes in the subset of aggregate queries.

13. The article of manufacture of claim 10, wherein the one or more instructions, when executed by a processor, further configure the processor to subject at least one of the aggregate queries in the subset of aggregate queries to a respective set of attribute filters specifying respective attribute range conditions for respective sets of attribute values associated with the at least one of the aggregate queries.

14. The article of manufacture of claim 13, wherein said at least one intermediate aggregate query is generated by combining respective attribute filters of two or more of the subset of aggregate queries to form a single attribute filter usable to pre-filter pre-aggregated data input to the two or more aggregate queries.

15. Apparatus, comprising:
a memory; and
a processor coupled to the memory and configured to:
  determine a set of aggregate queries to be executed on a data stream, the set of aggregate queries comprising queries that perform respective sets of aggregation operations on respective sets of attribute values over respective time intervals;
  generate at least one intermediate aggregate query for a subset of the set of aggregate queries, said at least one intermediate aggregate query combining a subset of aggregation operations for the subset of aggregate queries and a subset of attribute values;
  execute said at least one intermediate aggregate query to generate pre-aggregated data from the data stream for the subset of queries; and
  execute the subset of aggregate queries on the pre-aggregated data subsequent to executing said at least one intermediate aggregate query;
  wherein each of at least two aggregate queries in the subset of aggregate queries comprises:
    a number of group-by attributes on which aggregation is performed; and
    a time interval over which aggregation is performed.

16. The apparatus of claim 15, wherein the processor is configured to generate said at least one intermediate aggregate query by determining that said at least one intermediate aggregate query reduces a computational cost of executing the set of aggregate queries to be executed on the data stream.

17. The apparatus of claim 15, wherein said at least one intermediate aggregate query comprises a number of group-by attributes, the number of group-by attributes in said at least one intermediate aggregate query being less than a sum of the numbers of group-by attributes in the subset of aggregate queries.

18. The apparatus of claim 15, wherein the processor is further configured to subject at least one of the aggregate queries in the subset of aggregate queries to a respective set of attribute filters specifying respective attribute range conditions for respective sets of attribute values associated with the at least one of the aggregate queries.

19. The apparatus of claim 18, wherein said at least one intermediate aggregate query is generated by combining respective attribute filters of two or more of the subset of aggregate queries to form a single attribute filter usable to pre-filter pre-aggregated data input to the two or more aggregate queries.

20. The apparatus of claim 15, wherein the data stream comprises at least one of: network traffic records; sensor node readings; call detail records in a telecommunications network; retail transaction records; and one or more financial tickers.

* * * * *